Jan. 5, 1965
N. H. OLSSON
3,163,883
HINGE MEANS FOR INTERCONNECTING HATCH
COVER SECTIONS AND THE LIKE
Filed Oct. 7, 1960
3 Sheets-Sheet 1
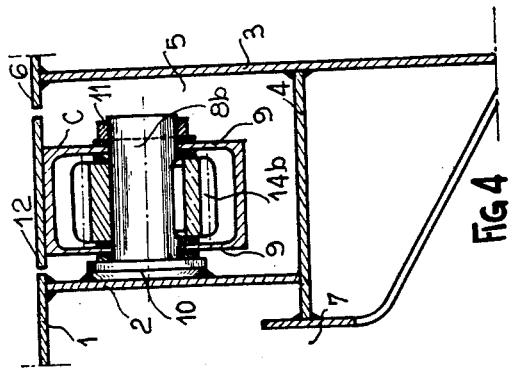
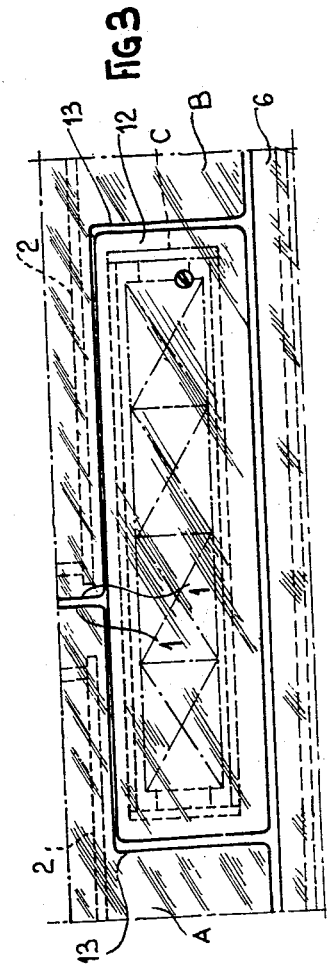
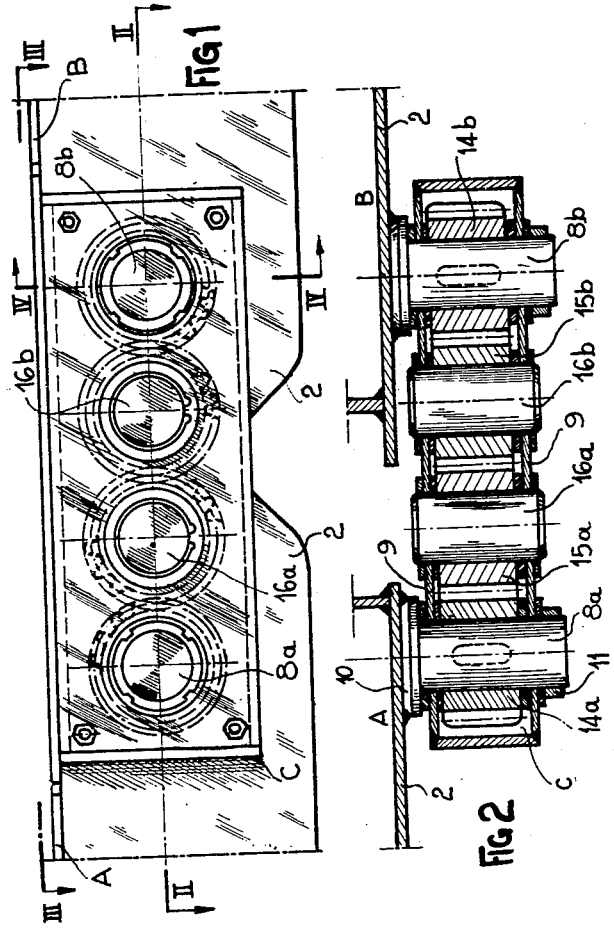
INVENTOR
NILS HUGO OLSSON
BY
ATTORNEYS

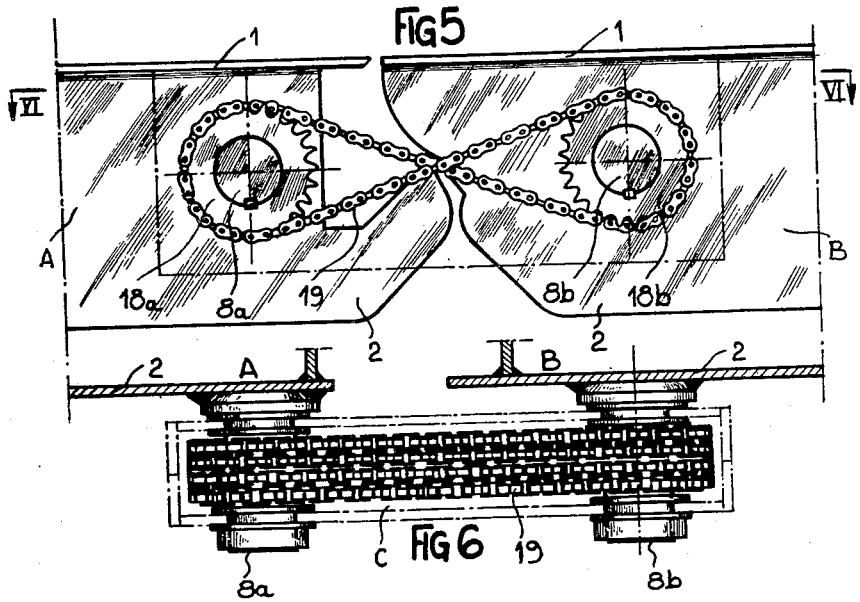
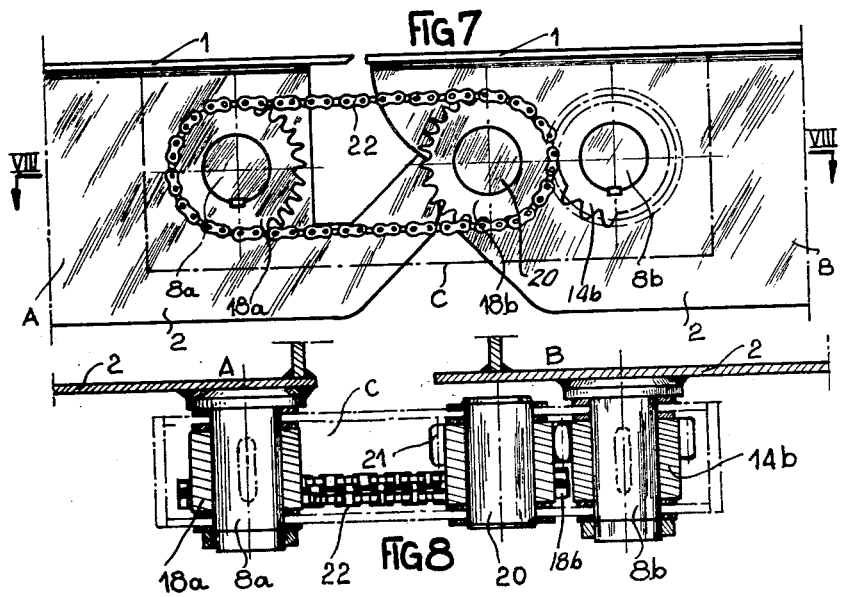

Jan. 5, 1965  N. H. OLSSON  3,163,883
HINGE MEANS FOR INTERCONNECTING HATCH
COVER SECTIONS AND THE LIKE
Filed Oct. 7, 1960  3 Sheets-Sheet 3
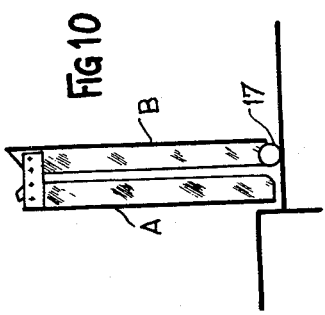
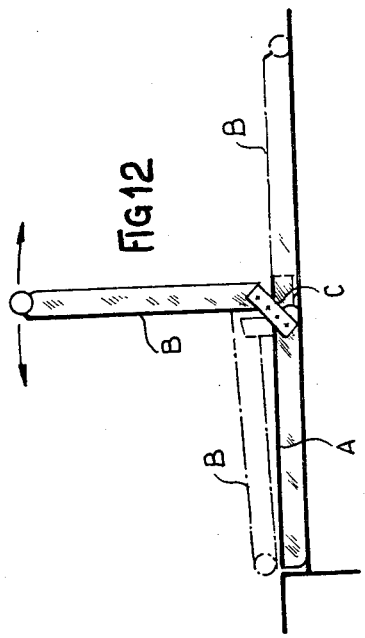
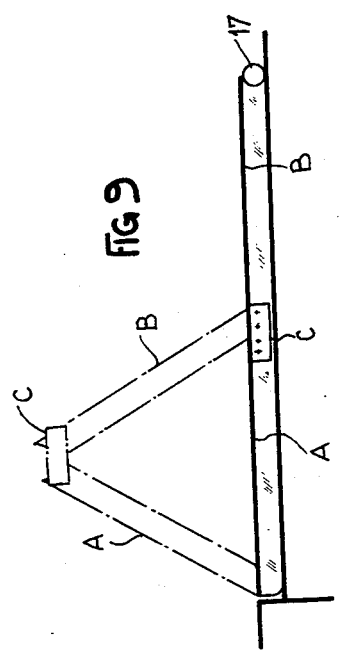
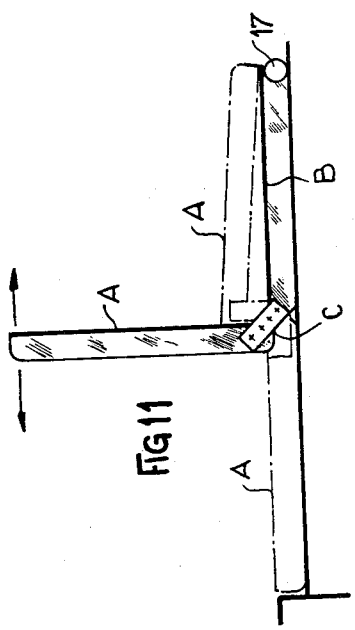
INVENTOR
NILS HUGO OLSSON
BY
*Kenyon & Kenyon*
ATTORNEYS

United States Patent Office 3,163,883
Patented Jan. 5, 1965

3,163,883
HINGE MEANS FOR INTERCONNECTING HATCH
COVER SECTIONS AND THE LIKE
Nils Hugo Olsson, Goteborg, Sweden, assignor to International MacGregor Organization (I.M.G.O.), Monte Carlo, Monaco, a corporation of Monaco
Filed Oct. 7, 1960, Ser. No. 87,473
Claims priority, application Sweden Oct. 10, 1959
11 Claims. (Cl. 16—163)

This invention relates to hinge means for pivotally interconnecting the various sections of hatch covers of ships and other similar structures.

In known constructions of this character the hatch cover sections are interconnected by means of hinges so that they can pivot in relation to one another about a common pivot axis. With this conventional arrangement the maximum amplitude of the relative pivotal movements of the hatch cover sections cannot exceed 180°. According to the type of hinge means utilized, the hatch cover sections may be so adjusted that in the open position they contact each other with their lower faces or their upper faces, but as far as the same pair of sections is concerned only one of these possibilities is available.

It is the object of the present invention to provide a hinge device whereby two adjacent sections of a hatch cover or like structure can be pivoted through angles considerably greater than 180°. According to the present invention, the hinge device mounted between two adjacent sections of the cover structure or along the two adjacent lateral edges of these sections comprises two hinge pins each carried by one of the sections to be hingedly interconnected, these hinge pins being operatively connected through means comprising a transmission system so designed that when the sections are moved in relation to the hinge device they are automatically and mechanically controlled by the connecting means and the transmission system so as to assume predetermined relative positions.

Preferably, the connecting means are so disposed as to permit a reciprocal movement and a reciprocal relative position of the hatch cover sections with respect to the hinge device up to an angle of about 360°.

According to this invention, the sections of a same hatch cover are adapted to be actuated at will so that in one position their lower faces engage substantially each other whereas in another position it is their upper faces that engage substantially each other.

Advantageously, the connecting means between the aforesaid hinge pins is designed preferably in the form of a case enclosing the transmission system.

According to a preferred and advantageous form of embodiment of this invention, a toothed wheel is rotatably rigid with each one of the two aforesaid hinge pins, and between these two wheels at least one pair of intermediate toothed wheels are mounted for loose rotation on intermediate shafts or on the aforesaid connecting means so as to mesh with one another, one of these intermediate wheels meshing in addition with the toothed wheel carried by one of said hinge pins, the other intermediate toothed wheel meshing with the wheel mounted on the other hinge pin.

According to a modified embodiment of this invention, the transmission consists of at least one roller chain.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings, in which:

FIGURE 1 is a lateral elevational view of the hinge device according to a first form of embodiment;

FIGURE 2 is a horizontal section taken upon the line II—II of FIG. 1;

FIGURE 3 is a plan view from above of the same device, as seen in the direction of the arrows III—III of FIG. 1;

FIGURE 4 is a vertical section taken upon the line IV—IV of FIG. 1;

FIGURE 5 is a lateral elevational view of the hinge device according to a second form of embodiment;

FIGURE 6 is a horizontal section taken upon the line VI—VI of FIG. 5;

FIGURE 7 is a lateral elevational view showing a third form of embodiment;

FIGURE 8 is a horizontal section taken upon the line VIII—VIII of FIG. 7; and

FIGURES 9 to 12 are diagrammatic views illustrating the possibilities of positioning hatch cover sections interconnected by means of the hinge devices according to either one of the forms of embodiment of the invention.

In the drawings, the reference letters A and B designate the two hatch cover sections preferably of sheet metal construction, interconnected by the hinge means of this invention. Each hatch cover section comprises essentially a top plate 1 and side flanges 2 conveniently attached to said top plate. The external frame surrounding the cover comprises a side plate 3 (FIG. 4) and a bottom plate 4 to form outwardly and downwardly a space 5 underlying the deck surface 6 about the hatchway aperture 7. The frame and hatchway cover sections may be constructed otherwise than the structure shown, as the details of this structure are given only to facilitate the understanding of the example illustrated in the drawings.

Mounted in the vicinity of the joint between the sections A and B are horizontal pins 8a, 8b welded or otherwise rigidly connected to each flange 2 on the two opposite sides of the section. These two pins are interconnected by a kind of link in the form of an elongated case designated generally by the reference letter C. This case C acts somewhat like a connecting rod. The vertical longitudinal walls 9 of this case fit on the pins 8a, 8b, axial sliding movement of the case on these pins being prevented by a collar 10 provided on the pin near the flange 2 and by a nut 11 screwed on the outer end of each pin on the opposite side of the case. This case is disposed in the space 5 (see FIG. 4) of which the upper side is closed by the top surface of the case or, if desired, by a plate 12 secured on the upper portion, and in order to provide sufficient room for the case between the adjacent deck top plate and the cover sections, the marginal portions of the deck top plate which project laterally beyond the flanges 2 are formed with longitudinal notches or cavities 13 as shown in FIG. 3.

The case C encloses the hinge pins 8a, 8b and a mechanism for transmitting the movement of rotation between these pins. The various forms of embodiments of this invention differ from one another only according to the design of the transmission mechanism, but the mode of operation of these alternative forms of embodiments is essentially similar.

In the form of embodiment illustrated in FIGS. 1 to 4 of the drawings this transmission comprises toothed wheels 14a, 14b keyed on each hinge pin 8a, 8b respectively, these toothed wheels being preferably similar to each other. In the common axial plane of the pins 8a, 8b, the two toothed wheels 15a, 15b are also similar to each other and are mounted for loose rotation on the hinge pins 16a, 16b, these pins being mounted in the lateral wall 9 of the case so as to prevent the pins and wheels from moving in their axial direction. The intermediate wheels 15a, 15b may have the same number of teeth as wheels 14a, 14b, but this is not compulsory.

When the hatch cover sections are in their inoperative positions the toothed wheels are in meshing engagement and the transmission is only operative when the angle between sections A and B is changed. If it is desired to bring these sections from the position shown in solid lines in FIG. 9 (in which they close or cover the hatchway aperture), or from the open position to the position shown in chain-dotted lines in the same figure, a hoisting force is applied preferably near the joint between these sections. During this hoisting movement the link remains practically in horizontal position. Therefore, the toothed wheels 14a, 14b secured on their pins 8a and 8b perform an angular movement in relation to the case C which corresponds to the angle formed by the hatch cover sections with the horizontal. This relation may also be characterized in that during the relative displacement of the hatch sections the bisectrix of the angle formed between these sections is perpendicular to the longitudinal axis of the case C or to the plane containing the wheel axes. Since the wheels 14a and 14b are interconnected by the intermediate wheels 15a and 15b, the angular rotation of the two elements will be synchronized if the horizontal position of the case is maintained, and thus the sections are actuated mechanically throughout their angular displacement which may vary from the angle shown in chain-dotted lines in FIG. 9 to the angle illustrated in FIG. 10 in which the hatch cover sections have been moved to a position in which their lower faces are parallel to and register with each other. The function of this transmission is to maintain the case C during the movement, in a constantly horizontal position and therefore the angular displacement of these sections cannot be attended by a movement of either one of these sections in their plane. For example, in the position shown in FIG. 10, the cover sections are constantly in a predetermined relative position.

During the hoisting movement, the lower end of one or both sections rests on a roller 17 carried by one of the sections.

Considering now FIG. 11, it will be seen that the problem consists in moving section A from a position shown in chain-dotted lines on the left-hand side to a vertical position shown in solid lines, and from this last-named position to a folded position shown in chain-dotted position on the right-hand side, wherein the top of section A registers with the top of section B. During this movement, the toothed wheel 14a is rotated angularly through an angle corresponding to the rotation of section A, the wheel 14b being inoperative and case C describing an angular movement about the axis of pin 8b through an angle representing one-half of the angle of rotation of section A. The mechanical operation of section A is similar to the operation described hereinabove. The mechanical operation is similar if, on the other hand, as shown in FIG. 12, section B is caused to pivot from its horizontal position toward the horizontal section A supported by the frame.

In the form of embodiment illustrated in FIGS. 5 and 6 of the drawings, the transmission system comprises neither intermediate wheels nor intermediate pins. The movement of rotation between the shafts 8a and 8b is transmitted through a chain transmission comprising chain sprockets 18a and 18b keyed on the hinge pins and roller chains 19 actuated by these wheels. The transmission may comprise one or a plurality of roller chains. The chain runs cross each other so as to actuate the hatch cover sections in a manner similar to the operation described hereinabove in connection with the form of embodiment shown in FIGS. 1 to 4.

To avoid the inconveniences of crossed chains, an intermediate shaft 20 may be mounted in the case C as shown in FIGS. 7 and 8. This intermediate shaft carries a toothed pinion or wheel 21 rotatably solid with one or more sprocket wheels 18b. By using parallel-sided roller chains 22 these sprockets are operatively connected to corresponding sprockets 18a keyed on the hinge pin 8a. The toothed pinion or wheel 21 rigid with the intermediate shaft 20 meshes with another toothed pinion or wheel 14b keyed on the pin 8b. In this case too the hatch cover sections are actuated mechanically in a manner similar to that described with reference to the form of embodiment illustrated in FIGS. 1 to 4. Of course, the invention should not be construed as being limited to the specific forms of embodiment shown in the drawing and described hereinabove, for many details thereof may be changed without departing from the spirit and scope of the invention as set forth in the appended claims. Besides, it may be emphasized that the problem considered herein can be solved to some extent by providing a transmission incorporating only two toothed wheels mounted on the hinge pins 8a and 8b and meshing directly with each other. However, in most cases this construction is not convenient since the hinge pins must be located at some distance from each other, and requires therefor the use of toothed wheels of relatively great diameter, which should preferably be avoided for obvious constructional reasons. On the other hand, a toothed-wheel transmission comprising more than one pair of intermediate wheels 15a, 15b may also be contemplated for the purpose set forth.

Of course, the invention is not limited to the forms of embodiment described and illustrated herein by way of example.

What I claim is:

1. A device for hingedly interconnecting a pair of adjacent movable panels, such as folding hatch cover sections, adapted to be extended in flat co-planar aligned relationship in their hatch closing position and to be swung each one in either direction relative to the other panel through angles exceeding 180°, comprising at least one pair of substantially parallel registering hinge pins directly integral with each one of said panels respectively and parallel to the joint therebetween and near the opposed edges of said joint, a pair of toothed wheels carried by and coaxial with said hinge pins and fixedly secured thereto respectively, a single rigid link means carried by and pivotally connecting said hinge pins substantially at right angles thereto, whereby the distance between centers thereof is greater than the sum of the outer radii of said wheels, and positive gear transmission means carried by said link means for operatively interconnecting said pair of toothed wheels and adapted to allow a relative reciprocal rotation of any one of said panels through an angle of up to 360° so as to come close and approximately parallel to the other panel.

2. A device according to claim 1, wherein said hinge pins are stud pins projecting outwards and sidewise from said panels respectively.

3. A device according to claim 1, wherein said link means is formed by an elongated casing-like frame enclosing said toothed wheels and said transmission means.

4. A device according to claim 1 wherein at least one of said toothed wheels is a cog wheel and said transmission means comprise at least one loose rotatable intermediate cog pinion carried by said link means and located between said toothed wheels whereby said cog pinion is in meshing engagement with said cog wheel, and positive gear transmission members operatively connecting said cog pinion to said other toothed wheel.

5. A device according to claim 4 wherein said other toothed wheel is a cog wheel too and said gear transmission members are constituted by at least another loose rotatable intermediate cog pinion carried by said link means and located between said other toothed wheel and the first said cog pinion and meshing with said other toothed wheel and with the first said cog pinion, the axes of all of these cog wheels and pinions which form a gear train being disposed in substantially coplanar relationship.

6. A device according to claim 4 wherein said other toothed wheel is a sprocket wheel and said gear transmission members comprise a sprocket pinion coaxial with said intermediate cog pinion and rigidly connected thereto and located in parellel registering relationship with said sprocket wheel, and at least an endless sprocket chain operatively interconnecting said sprocket wheel and cog pinion.

7. A device according to claim 1, wherein said link means is formed by an elongated casing-like frame fully enclosing said toothed wheels and said transmission means mounted therein, the overall size and mounting of said link means being such that it is accommodated between the plane levels of the panel top and bottom faces respectively limiting the panel thickness, in the panel closing position.

8. A device according to claim 7, wherein at least one of said toothed wheels is a cog wheel and said transmission means comprise at least one intermediate idler cog pinion carried by said link means and located between said toothed wheels whereby said idler cog pinion is in meshing engagement with said cog wheel and positive gear transmission members operatively connecting said idler cog pinion to the other toothed wheel.

9. A device according to claim 8, wherein the other toothed wheel is a cog wheel too and said gear transmission members consist of at least another intermediate idler cog pinion carried by said link means and located between said other toothed wheel and the first said cog pinion and meshing with said other toothed wheel and with the first said cog pinion, the axes of all of these cog wheels and pinions which form a gear train being arranged in substantially coplanar relationship.

10. A device according to claim 9 including stud pins for said cog wheels and wherein all of said cog wheels and pinions have the same number of teeth and said link means is formed with two opposed side walls journalled on said stud pins, said cog pinions being respectively keyed on gudgeon-like shafts rotatably mounted on and between said side walls.

11. A device according to claim 10, wherein said link means is formed with an outer top face which is adapted to be in substantially flush relationship with the top faces of said panels in the closing position of the latter.

References Cited by the Examiner
UNITED STATES PATENTS

| | | | |
|---|---|---|---|
| 465,112 | 12/91 | Kearsing | 16—165 |
| 1,167,906 | 1/16 | Le Compte. | |
| 1,170,478 | 2/16 | Cocks | 16—163 |
| 1,455,513 | 5/23 | Von Tell | 114—201 |
| 2,206,739 | 7/40 | Brogen et al. | 16—164 |
| 2,981,326 | 4/61 | MacGregor | 160—188 |

FOREIGN PATENTS

| | | |
|---|---|---|
| 789,651 | 1/58 | Great Britain. |
| 837,533 | 6/60 | Great Britain. |

DONLEY J. STOCKING, *Primary Examiner.*

JOSEPH SEERS, *Examiner.*